(12) United States Patent
Li et al.

(10) Patent No.: US 8,938,513 B2
(45) Date of Patent: Jan. 20, 2015

(54) METHOD AND SYSTEM FOR CREATING MULTIMEDIA MESSAGE

(75) Inventors: Ruili Li, Shenzhen (CN); Xiaoli Yuan, Shenzhen (CN); Yonggang Hu, Shenzhen (CN); Yingying Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 188 days.

(21) Appl. No.: 13/640,850

(22) PCT Filed: Jun. 15, 2011

(86) PCT No.: PCT/CN2011/075752
§ 371 (c)(1),
(2), (4) Date: Oct. 12, 2012

(87) PCT Pub. No.: WO2012/151772
PCT Pub. Date: Nov. 15, 2012

(65) Prior Publication Data
US 2013/0117388 A1    May 9, 2013

(30) Foreign Application Priority Data
May 6, 2011    (CN) .......................... 2011 1 0117064

(51) Int. Cl.
*G06F 15/16* (2006.01)
*H04L 12/58* (2006.01)
(Continued)

(52) U.S. Cl.
CPC .......... *H04L 51/10* (2013.01); *H04M 3/53366* (2013.01); *H04M 1/72552* (2013.01); *H04M 3/5307* (2013.01); *H04W 4/12* (2013.01)
USPC ......................................... 709/206; 455/466

(58) Field of Classification Search
CPC ................. G06Q 10/107; H04L 51/10; H04L 2012/2841; H04M 2203/254; H04M 1/72547; H04W 4/12; H04W 4/14
USPC .......................................................... 709/206
See application file for complete search history.

(56) References Cited

U.S. PATENT DOCUMENTS 6,510,427 B1 *    1/2003  Bossemeyer et al. ................. 1/1
7,636,584 B2 *    12/2009  Anderson et al. .......... 455/556.2
(Continued)

FOREIGN PATENT DOCUMENTS

CN            1571566 A        1/2005
CN            101452544 A      6/2009
(Continued)

*Primary Examiner* — Bryan Lee
*Assistant Examiner* — Quang Le
(74) *Attorney, Agent, or Firm* — Ling Wu; Stephen Yang; Ling and Yang Intellectual Property

(57) ABSTRACT

The present invention provides a method for creating a multimedia message, including: receiving a request for creating the multimedia message; establishing a connection channel between a multimedia message resource pool and a module storing multimedia message content resources on a mobile terminal; storing a required multimedia message content resource into the multimedia message resource pool through the connection channel; and organizing the multimedia message content resource in the multimedia message resource pool according to preset multimedia message organization parameters, and generating the multimedia message. With the technical scheme of the present invention, it can be avoided that switching always happens between the multimedia message creation interface and the resource management interface repeatedly in the multimedia message creation process and the user operation can be simplified.

12 Claims, 4 Drawing Sheets

(51) Int. Cl.
*H04M 3/533* (2006.01)
*H04M 1/725* (2006.01)
*H04M 3/53* (2006.01)
*H04W 4/12* (2009.01)

(56) References Cited

U.S. PATENT DOCUMENTS

2005/0136953 A1* 6/2005 Jo et al. .................. 455/466
2006/0052118 A1* 3/2006 Furon et al. ................ 455/466
2007/0198731 A1* 8/2007 Li et al. ..................... 709/230
2011/0125864 A1* 5/2011 Zhang ....................... 709/206

FOREIGN PATENT DOCUMENTS

| | | | |
|---|---|---|---|
| CN | 101552829 A | 10/2009 | |
| CN | 101562795 A | 10/2009 | |
| CN | 101895834 A | 11/2010 | |
| CN | 101945346 A | 1/2011 | |

* cited by examiner

METHOD AND SYSTEM FOR CREATING MULTIMEDIA MESSAGE

TECHNICAL FIELD

The present invention relates to the multimedia messaging service (MMS) technology in the mobile communication, and in particular, to a method and system for creating a multimedia message.

BACKGROUND OF THE RELATED ART

Along with various storage contents of the mobile terminal and the growing number of the users of the mobile terminal, the multimedia information service, which is also called the multimedia message, is becoming an important way for instant communication and sharing various resources among the mobile terminal users because the multimedia information service can transmit and display colorful information such as the picture, audio, video, text etc., to the user dynamically.

The multimedia message generally includes five contents: a recipient address, a subject, a text content, a multimedia content and an attachment (these five contents are called as five roles of the multimedia message hereinafter). The multimedia message can include a plurality of pages, besides the first page, other pages generally only include two items, the text content and the multimedia content. At present, in various mobile terminals, the multimedia message creation method is generally that: the user adds the recipient address, the subject, the text content and the multimedia content in the default created multimedia message page, then creates the new multimedia message page one by one according to the requirement, and then adds the text content and the multimedia content including one or more of the picture, the audio and the video into the new created multimedia message page sequentially. If necessary, the user also needs to add the multimedia message attachment into the attachment page individually.

The multimedia message protocol in the Time Division-Synchronous Code Division Multiple Access (TD-SCDMA) specifies that one multimedia message can include 20 pages at most. According to the above-mentioned current multimedia message creation method, if the user creates one multimedia message including 20 pages and each page includes one picture, then the user needs to creates the multimedia message page for 19 times repeatedly, adds the picture resources for 20 times, and the operation is extremely heavy and complicated. Meanwhile, in the current method, the user should open the resource manager once each time when adding one multimedia content to browse and select the required multimedia resource, therefore, if the user adds several multimedia contents in an identical multimedia message page, the resource manager should be opened many times to finish the creation of the single multimedia message page.

To sum up, with the current method for creating the multimedia message, the user needs to repeat the multimedia message pages creation operation several times and switch over several times between the resource management interface and the multimedia message creation interface, which increases the operation complexity and reduces the joyful experience of the user using the multimedia message service.

SUMMARY OF THE INVENTION

The present invention provides a method and system for creating a multimedia message, to solve the technical problem that switching always happens between the multimedia message creation interface and the resource management interface repeatedly in the multimedia message creation process and an operation by a user is complicated.

In order to solve the above-mentioned problem, the present invention provides a method for creating a multimedia message, comprising:

receiving a request for creating the multimedia message;

establishing a connection channel between a multimedia message resource pool and a module storing multimedia message content resources on a mobile terminal;

storing a required multimedia message content resource into the multimedia message resource pool through the connection channel; and organizing the multimedia message content resource in the multimedia message resource pool according to preset multimedia message organization parameters, and generating the multimedia message.

Preferably, the multimedia message organization parameters comprise one or more of the following:

a multimedia message organization rule and a resource supported by each content of the multimedia message.

Preferably, the multimedia message organization parameters further comprise a maximum number of pages of the multimedia message and a capacity of the multimedia message;

the capacity of each page of the multimedia message is calculated according to the maximum number of pages of the multimedia message and the capacity of the multimedia message;

the step of organizing the multimedia message content resource in the multimedia message resource pool according to preset multimedia message organization parameters comprises:

obtaining a current number of pages of the multimedia message, judging whether the current number of pages of the multimedia message reaches the maximum number of pages of the multimedia message, and whether a current capacity of the multimedia message reaches the capacity of each page of the multimedia message, if not reached, waiting for a new multimedia message content resource which enters the multimedia message resource pool and is stored, and continuing to organize the new multimedia message content resource.

Preferably, the multimedia message content resources comprise one or more of the following:

a telephone number, text, video image and audio.

Preferably, the step of storing the multimedia message content resource into the multimedia message resource pool through the connection channel comprises:

storing the multimedia message content resource and a corresponding use of the multimedia message content resource into the multimedia message resource pool.

Preferably, the corresponding use of the multimedia message content resource is determined by the following way:

judging whether the current multimedia message content resource is a resource supported by a plurality of multimedia message contents according to the resource supported by each content of the multimedia message; if yes, sending out an instruction for selecting the multimedia message content that supports the multimedia message content resource, after receiving a selection confirmation instruction, taking the multimedia message content which has been selected and determined as the corresponding use of the current multimedia message content resource to store into the multimedia message resource pool; if not, storing the use of the multimedia message content resource to the multimedia message resource pool directly.

Preferably, the step of organizing the multimedia message content resource in the multimedia message resource pool according to preset multimedia message organization parameters comprises:

organizing the multimedia message content resource already stored in the multimedia message resource pool into the corresponding multimedia message content according to the corresponding use of each multimedia message content resource.

Preferably, the multimedia message content resources with the same use are organized in the corresponding multimedia message contents according to an order by which the multimedia message content resources with the same use are stored into the multimedia message resource pool.

In order to solve the above-mentioned technical problem, the present invention further provides a system for creating a multimedia message, comprising: a multimedia message resource pool, a multimedia message resource pool management module, a resource connection module, a multimedia message organization parameter setting module and a resource organization module, wherein, the multimedia message resource pool is configured to: store a multimedia message content resource;

the multimedia message resource pool management module is configured to: after receiving a request for creating the multimedia message, notify the resource connection module to establish a connection channel between a multimedia message resource pool and a module storing multimedia message content resources on a mobile terminal; and store a required multimedia message content resource into the multimedia message resource pool through the connection channel;

the resource connection module is configured to: after receiving a notification of the multimedia message resource pool module, establish the connection channel between the module storing the multimedia message content resources on the mobile terminal and the multimedia message resource pool;

the multimedia message organization parameter setting module is configured to: set multimedia message organization parameters; and the resource organization module is configured to: organize the multimedia message content resource stored in the multimedia message resource pool according to the parameters set by the multimedia message organization parameter setting module, and generate the multimedia message.

Preferably, the parameters set by the multimedia message organization parameter setting module comprise one or more of the following: a multimedia message organization rule and a resource supported by each content of the multimedia message.

Preferably, the module storing the multimedia message content resources on the mobile terminal comprises one or more of the following: an address book module, a memorandum book module and a multimedia resource management module.

Preferably, the multimedia message organization parameter setting module is further configured to set a maximum number of pages of the multimedia message and a capacity of the multimedia message;

the multimedia message resource pool management module is configured to calculate the capacity of each page of the multimedia message according to the maximum number of pages of the multimedia message and the capacity of the multimedia message;

the resource organization module is configured to organize the multimedia message content resource stored in the multimedia message resource pool according to the parameters set by the multimedia message organization parameter setting module by the following way:

obtaining a current number of pages of the multimedia message, judging whether the current number of pages of the multimedia message reaches the maximum number of pages of the multimedia message, and whether a current capacity of the multimedia message reaches the capacity of each page of the multimedia message, if not reached, waiting for a new multimedia message content resource which enters the multimedia message resource pool and is stored, and continuing to organize the new multimedia message content resource.

Preferably, the multimedia message resource pool management module is configured to store the multimedia message content resource into the multimedia message resource pool through the connection channel by the following way:

storing the multimedia message content resource and a corresponding use of the multimedia message content resource into the multimedia message resource pool.

Preferably, the multimedia message resource pool management module is configured to determine the use of the multimedia message content resource by the following way:

judging whether the current multimedia message content resource is a resource supported by a plurality of multimedia message contents according to the resource supported by each content of the multimedia message; if yes, sending out an instruction for selecting the multimedia message content that supports the multimedia message content resource, after receiving a selection confirmation instruction, taking the multimedia message content which has been selected and determined as the corresponding use of the current multimedia message content resource to store into the multimedia message resource pool; if not, storing the use of the multimedia message content resource to the multimedia message resource pool directly.

Preferably, the resource organization module is configured to: organize the multimedia message content resource stored in the multimedia message resource pool according to the parameters set by the multimedia message organization parameter setting module by the following way:

organizing the multimedia message content resource already stored in the multimedia message resource pool into the corresponding multimedia message content according to the corresponding use of each multimedia message content resource.

Preferably, the resource organization module is configured to: organize the multimedia message content resources with the same use according to an order by which the multimedia message content resources with the same use are stored into the multimedia message resource pool.

By adopting the above-mentioned technical scheme of the present invention, a user does not need to enter the multimedia message creation interface, thus the multimedia message page creation operation which is repeated for several times is omitted; the user only needs to put the multimedia message content resource already stored by terminal into the resource pool and so that the terminal can finish the multimedia message creation, and the user does not need to perform the switching operation repeatedly between the multimedia message creation interface and the resource manager; and each time the new multimedia message content resource is obtained, and then it is added into the multimedia message creation process, compared with creating the multimedia message after obtaining all multimedia message content resources, it saves the expenses of the terminal on the resource searching and the resource output; in addition, the multimedia message content resource is not limited to the resources in the multimedia manager, it can also include the address book, note book, etc., which makes the multimedia message creation process meet the user reality requirement much more and improves the user experience.

PREFERRED EMBODIMENTS OF THE PRESENT INVENTION

In order to make the objective, technical scheme and advantage of the present invention more clear and obvious, the embodiment of the present invention is described in detail with reference to the accompanying drawings hereinafter. It should be illustrated that, in the case of no conflict, the embodiments in the present application and features in these embodiments can be combined with each other.

Embodiment One

Figure 1:
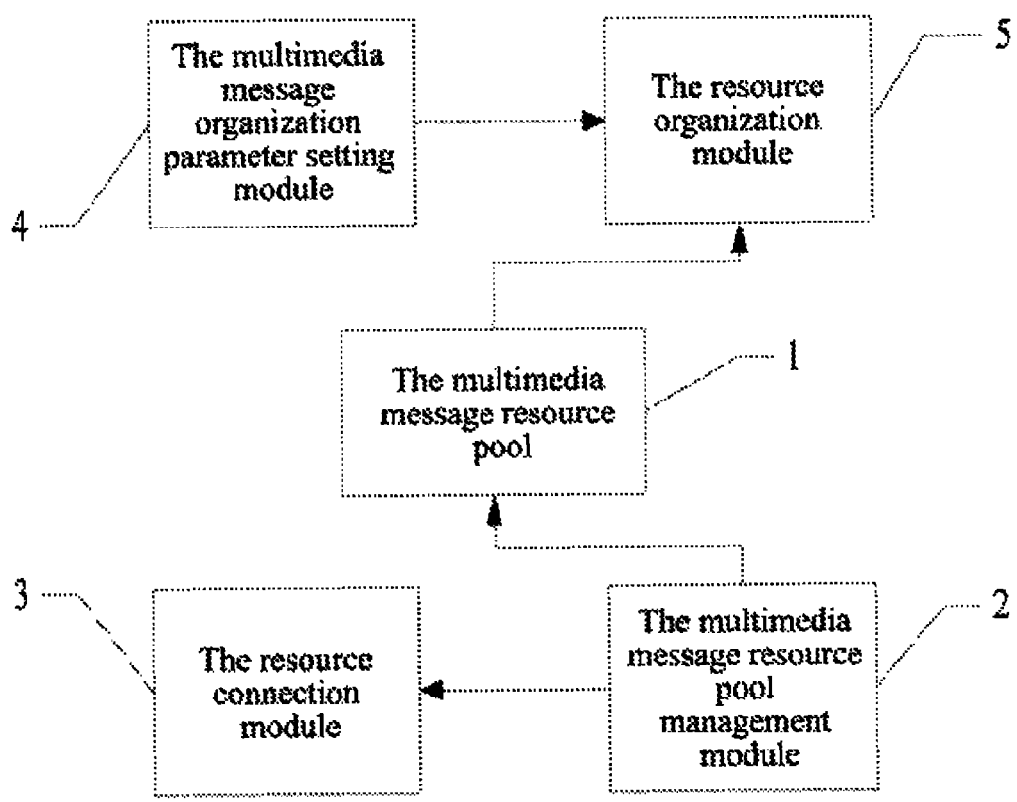
FIG. 1 is a diagram of internal function modules of a system for creating a multimedia message according to an embodiment of the present invention.

Referring to FIG. 1, it is a diagram of internal function modules of a system for creating a multimedia message according to an embodiment of the present invention. In the established embodiment, the system for creating a multimedia message includes: a multimedia message resource pool 1, a multimedia message resource pool management module 2, a resource connection module 3, a multimedia message organization parameter setting module 4 and a resource organization module 5, wherein:

the multimedia message resource pool 1 is configured to: store a multimedia message content resource; the multimedia message content resource at least includes telephone numbers and text, and further can include the multimedia resources, such as video, audio, etc.;

the multimedia message resource pool management module 2 is configured to: after receiving a request for creating the multimedia message, notify the resource connection module 3 to establish a connection channel between a multimedia message resource pool and a module storing multimedia message content resources on a mobile terminal; and store a required multimedia message content resource into the multimedia message resource pool through the connection channel;

the multimedia message resource pool management module 2 is also configured to manage the multimedia message content resource stored by the multimedia message resource pool 1, judge whether the multimedia message resource pool 1 is established, establish the multimedia message resource pool 1 in a case that the multimedia message resource pool 1 is not established, and after generating the multimedia message, delete the multimedia message content resource in the multimedia message resource pool 1, etc.;

after the multimedia message resource pool management module 2 knows that the multimedia message resource pool is already established, the application module storing the multimedia message content resources on the mobile terminal is notified that the multimedia message resource pool 1 is already established by a broadcasting way, so that the application module establishes the icon of the multimedia message resource pool on the its own visual interface or menu bar;

managing the multimedia message content resource stored in the multimedia message resource pool 1 includes: numbering the multimedia message content resource according to the order by which the multimedia message content resource is stored in the multimedia message resource pool 1, determining and storing the use of the multimedia message content resource added in the multimedia message resource pool 1, etc.;

determining and storing the use of the multimedia message content resource added in the multimedia message resource pool 1 includes the following in steps: judging whether the current multimedia message content resource is a resource supported by a plurality of multimedia message contents according to the parameter, the resource supported by each content of the multimedia message set by the multimedia message organization parameter setting module 4; if yes, sending out an instruction of selecting the multimedia message content that supports the multimedia message content resource to the user, after receiving a selection confirmation instruction of the user, taking the multimedia message content which has been selected and determined as the corresponding use of the multimedia message content resource and storing it into the multimedia message resource pool; if not, storing the use of the multimedia message content resource into the multimedia message resource pool directly;

the multimedia message resource pool management module 2 is further used to number the multimedia message content resource according to the precedence order by which the multimedia message content resource is transferred to the multimedia message resource pool, and store the number into the multimedia message resource pool;

the resource connection module 3 is configured to: after receiving a notification of the multimedia message resource pool module 2, establish the connection channel between the module storing the multimedia message content resources on the mobile terminal and the multimedia message resource pool;

the multimedia message organization parameter setting module 4 is configured to: set the multimedia message organization parameter, such as the multimedia message page organization rule, the capacity of the multimedia message, the maximum number of pages of the multimedia message, the resource supported by each content of the multimedia message, etc.;

the resource organization module 5 is configured to: organize the multimedia message content resource stored in the multimedia message resource pool 1 according to the parameters set by the multimedia message organization parameter setting module 4, and generate the multimedia message.

The resource organization module 5 can further be used to store the generated multimedia message in the form of a file for the subsequent operation by the user.

Figure 2:
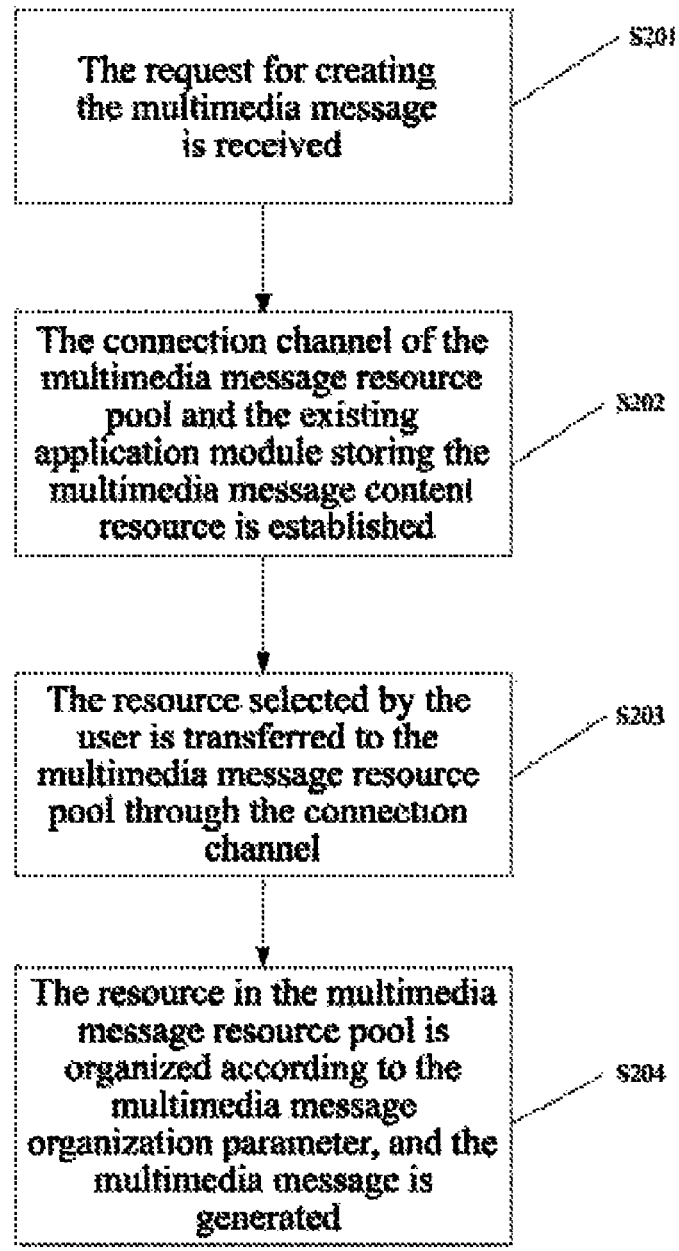
FIG. 2 is a flow chart of a method for creating a multimedia message according to an embodiment of the present invention.

Embodiment Two referring to FIG. 2, it is a flow chart of a method for creating a multimedia message according to an embodiment of the present invention.

Before creating the multimedia message, the user sets the multimedia message organization parameters, such as the multimedia message organization rule, the maximum number of pages of the multimedia message, the capacity of the multimedia message, the resource that each content of the multimedia message can support, etc., through the corresponding menu bar on the mobile terminal; the user also can select the factory default multimedia message organization parameter of the mobile terminal;

after the setting is finished, the user sends out the request for creating the multimedia message to the mobile terminal through the user interface UI module, and the mobile terminal performs the multimedia message creation operation according to the following steps:

in S201, the request for creating the multimedia message is received;

in S202, the connection channel between the multimedia message resource pool and the existing application module storing the multimedia message content resources is established;

in other embodiments, before the step S202, the mobile terminal also can judge whether there is already a multimedia message resource pool; if yes, step S202 is executed; otherwise, the multimedia message resource pool is established and step S202 is executed;

after the mobile terminal establishes the multimedia message resource pool, the multimedia message resource pool icon is added in its already existed application module storing the multimedia message content resources;

the multimedia message content resource at least includes the telephone number and text, in addition, it can include the multimedia resource such as the video, audio, etc.;

in S203, the multimedia message content resource required by the user is transferred to the multimedia message resource pool through the connection channel;

this step further includes: judging whether the current multimedia message content resource is a resource supported by a plurality of multimedia message contents according to the parameter, the resource supported by each content of the multimedia message; if yes, sending out an instruction of selecting the multimedia message content that supports the multimedia message content resource, after receiving a selection confirmation instruction of the user, taking the multimedia message content which has been selected and determined as the corresponding use of the multimedia message content resource and storing it into the multimedia message resource pool; otherwise, storing the use of the multimedia message content resource into the multimedia message resource pool directly;

for instance, the user selects a telephone number from the address book, since all these three parts of the multimedia message contents, i.e. the recipient, the text content and the attachment are set to support the telephone number when setting the multimedia message organization parameters, and now the mobile terminal will prompt the user to select one or more items from the three multimedia message contents "the recipient, the text content and the attachment", and takes the multimedia message content selected by the user as the corresponding use of this telephone number and stores it into the multimedia message resource pool;

the mobile terminal can also number the multimedia message content resource according to the precedence order by which the multimedia message content resource is transferred to the multimedia message resource pool, and stores this number into the multimedia message resource pool;

in S204, the multimedia message content resource in the multimedia message resource pool is organized according to the multimedia message organization parameter, and the multimedia message file is generated;

the step can include: organizing the multimedia message content resource already stored in the multimedia message resource pool as the corresponding multimedia message content according to its number and use, obtaining the current number of pages of the multimedia message after finishing the numbering, and calculating the capacity of each page of the multimedia message according to the maximum number of pages of the multimedia message and the capacity of the multimedia message; judging whether the current number of pages of the multimedia message reaches the maximum number of pages of the multimedia message, and the capacity of the current multimedia message reaches the capacity of each page of the multimedia message; if yes, sending out an indication message to the user; otherwise, waiting for the multimedia message content resource newly stored in the multimedia message resource pool and continuing to organize the multimedia message content resource newly stored in the multimedia message resource pool.

Wherein, organizing the multimedia message content resource already stored in the multimedia message resource pool as the corresponding multimedia message content according to its number and use refers to: organizing the multimedia message content resource already stored in the multimedia message resource pool into the corresponding multimedia message content according to the corresponding use of each multimedia message content resource; organizing the multimedia message content resources with the same use according to the order by which the multimedia message content resources with the same use are stored in the multimedia message resource pool.

the terminal can also not consider the number of the multimedia message content resource during the organization, and adjusts the arrangement sequence of the multimedia message content resources through the following manual operation.

After finishing the organization operation of the multimedia message resource, the user can open the generated multimedia message file to preview, edit, send and store it.

In the present invention, the mobile terminal shows the multimedia message content to the user through the current multimedia message edition interface, and now the user can still re-edit the multimedia message content according to the current operation method, including adjusting the arrangement sequence of the multimedia message content resources, etc.

Application Example One

FIG. 3A-3F are flow charts of the method for creating the multimedia message according to the application examples of the present invention.

Figures 3A, 3B:
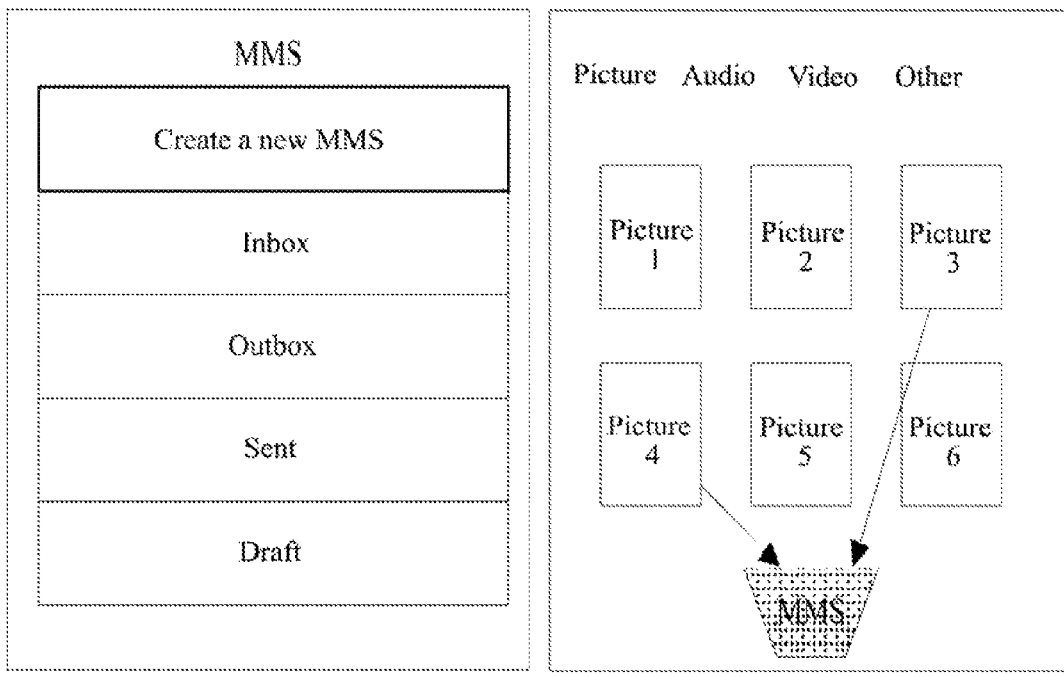
FIG. 3A-3G are diagrams of a method for creating a multimedia message according to application examples of the present invention.
Figures 3C, 3D:
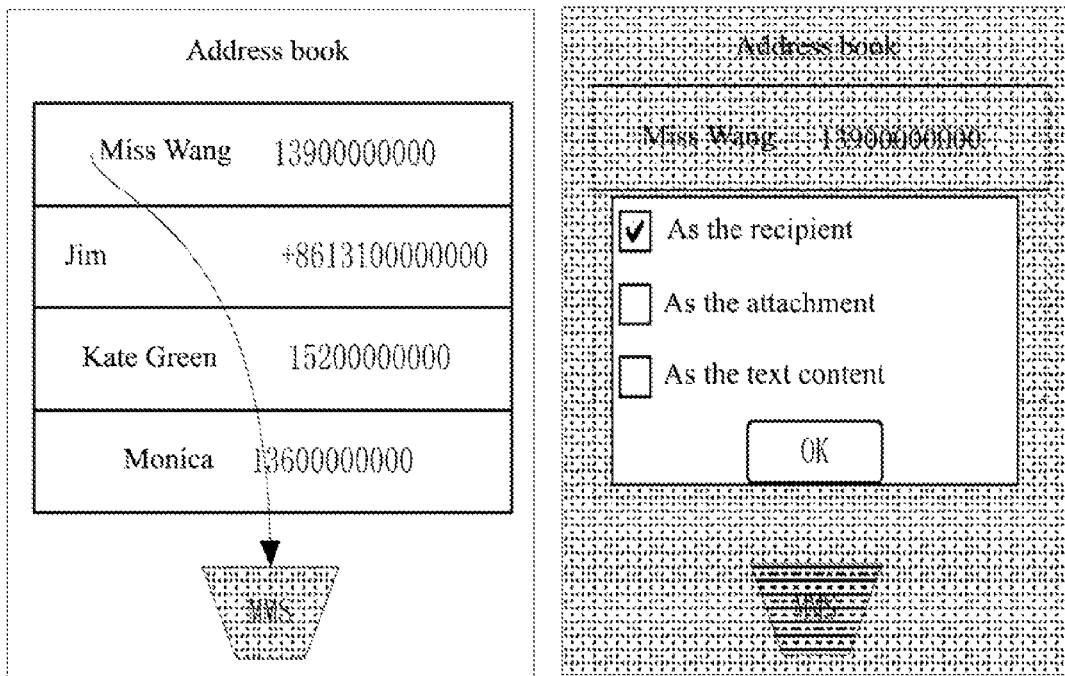
Figure 3E:
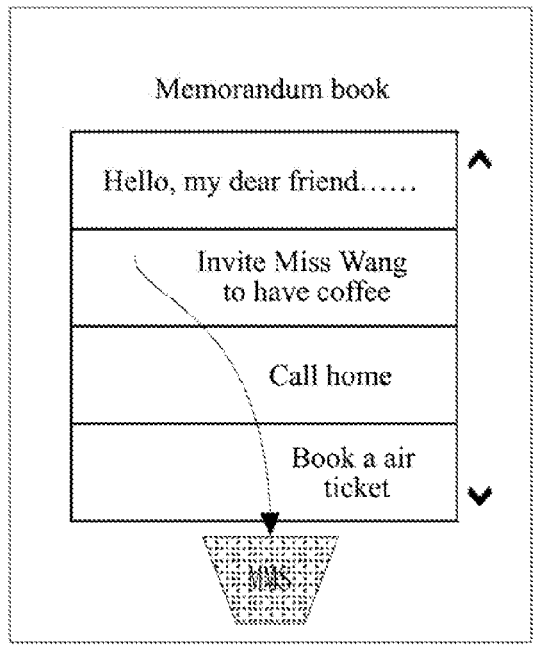
Figure 3F:
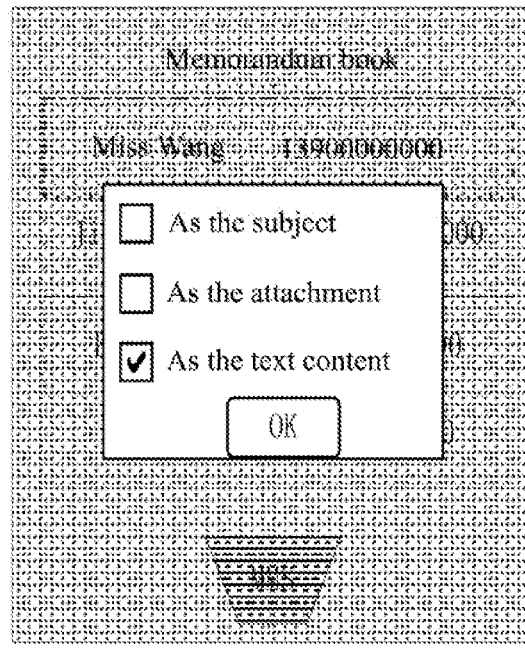
Figure 3G:
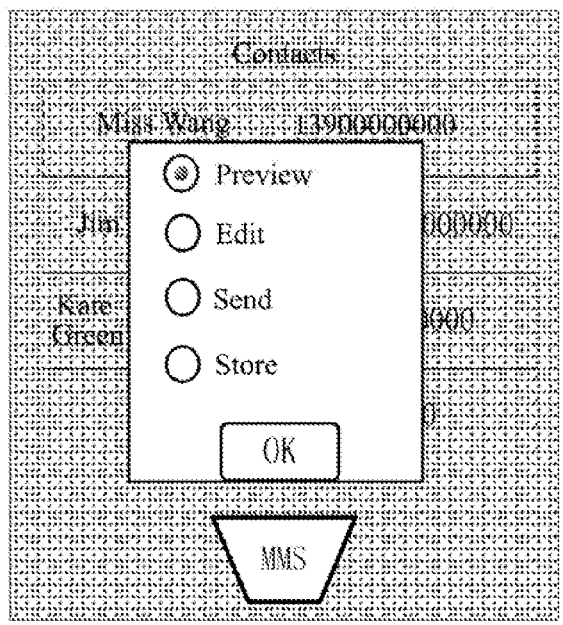

As shown in FIG. 3A, the user enters the multimedia message MMS menu bar, and sends out the request for creating the multimedia message to the mobile terminal by clicking an option "create new MMS";

the mobile terminal receives the request for creating the multimedia message, establishes the multimedia message resource pool, and adds an "MMS" icon in the application module, such as the terminal resource manager, the address book, the memorandum book, etc., and establishes the connection channel between the multimedia message resource pool and the above-mentioned application module;

as shown in FIG. 3B, the user enters the image library in the resource manager, selects two pictures, picture 3 and picture 4, and sends out the indication of transferring these two pictures to the multimedia message resource pool to the mobile terminal by pulling these two pictures into the "MMS" icon;

after the mobile terminal receives that indication, the operation of transferring the picture 3 and picture 4 to the multimedia message resource pool through the connection channel is finished;

as shown in FIG. 3C, the user enters the address book, selects the telephone number of "Miss Wang", and pulls it into the "MMS" icon;

the mobile terminal finishes the operation of transferring the telephone number selected by the user to the multimedia message resource pool through the connection channel;

as shown in FIG. 3D, the mobile terminal determines that there are a plurality of multimedia message contents that support this telephone number, and these multimedia message content are respectively "as the recipient", "as the attachment" and "as the text content". The mobile terminal pops up a check box, to prompt the user to select the multimedia message content supporting this telephone number actually; after receiving the selection confirmation instruction of the user, takes the multimedia message content "as the recipient" which has been selected and determined as the corresponding use of this telephone number and stores it into the multimedia message resource pool;

as shown FIG. 3E, the user enters the memorandum book, selects the text record of "invite Miss Wang to drink coffee", and pulls it into the "MMS" icon;

the mobile terminal finishes the operation of transferring the text record selected by the user to the multimedia message resource pool through the connection channel;

as shown in FIG. 3F, the mobile terminal judges that there are a plurality of multimedia message contents that support that text record, and these multimedia message content are respectively "as the subject", "as the attachment" and "as the text content". The mobile terminal pops up a check box to prompt the user to select the multimedia message content supporting that text record; after receiving the selection confirmation instruction of the user, takes the multimedia message content "as the text content" which has been selected and determined as the use of that text record and stores it into the multimedia message resource pool;

as shown in FIG. 3G, the user clicks the "MMS" icon, and sends the instruction opening the generated multimedia message file to the terminal; after the mobile terminal receives this instruction, a check box is popped up to prompt the user to "preview", "edit", "send" or "store" the generated multimedia message file.

It should be illustrated that the present invention can also have a variety of other embodiments. Those skilled in the art can make the corresponding modifications and variations according to the present invention without departing from the spirit and essence of the present invention. However all of these modifications or the variations should be embodied in the scope of the appending claims of the present invention.

INDUSTRIAL APPLICABILITY

In the scheme of the embodiment of the present invention, a user does not need to enter the multimedia message creation interface, thus the multimedia message page creation operation which is repeated for several times is omitted; the user only needs to put the multimedia message content resource already stored by terminal into the resource pool and so that the terminal can finish the multimedia message creation, and the user does not need to perform the switching operation repeatedly between the multimedia message creation interface and the resource manager; and each time the new multimedia message content resource is obtained, and then it is added into the multimedia message creation process, compared with creating the multimedia message after obtaining all multimedia message content resources, it saves the expenses of the terminal on the resource searching and the resource output; in addition, the multimedia message content resource is not limited to the resources in the multimedia manager, it can also include the address book, note book, etc., which makes the multimedia message creation process meet the user reality requirement much more and improves the user experience.

We claim:

1. A method for creating a multimedia message, comprising:
    receiving a request for creating the multimedia message in a mobile terminal;
    creating a multimedia message resource pool in the mobile terminal;
    establishing a connection channel between the multimedia message resource pool and a module storing multimedia message content resources in the mobile terminal;
    storing a required multimedia message content resource into the multimedia message resource pool through the connection channel; and
    organizing the multimedia message content resources in the multimedia message resource pool according to preset multimedia message organization parameters, and generating a multimedia message without requiring a user entering a user interface for creating a multimedia message and without requiring repeating the multimedia message creating process for each page of the multimedia message, wherein the multimedia message organization parameters comprise one or more of following: a multimedia message organization rule and a resource supported by each content of the multimedia message;
    wherein the multimedia message organization parameters are a system default setting of the mobile terminal or setup by the user before creating the multimedia message;
    wherein,
    the multimedia message organization parameters further comprise a maximum number of pages of the multimedia message and a capacity of the multimedia message;
    a capacity of each page of the multimedia message is calculated according to the maximum number of pages of the multimedia message and the capacity of the multimedia message;
    the step of organizing the multimedia message content resources in the multimedia message resource pool according to preset multimedia message organization parameters comprises:
    obtaining a current number of pages of the multimedia message, judging whether the current number of pages of the multimedia message reaches the maximum number of pages of the multimedia message, and whether a capacity of the current page of the multimedia message reaches the capacity of each page of the multimedia message, if not, waiting for a new multimedia message content resource to be stored into the multimedia message resource pool, and continuing to organize the new multimedia message content resource.

2. The method according to claim 1, wherein, the multimedia message content resource comprises one or more of the following:
    a telephone number, text, video image or audio.

3. The method according to claim 1, wherein, the step of storing the multimedia message content resource into the multimedia message resource pool through the connection channel comprises:
    storing the multimedia message content resource and a corresponding use of the multimedia message content resource into the multimedia message resource pool.

4. The method according to claim 3, wherein, the corresponding use of the multimedia message content resource is determined in the following way:
  judging whether a current multimedia message content resource is a resource supported by a plurality of multimedia message contents according to the resource supported by each content of the multimedia message; if yes, sending out an instruction of selecting a multimedia message content that supports the multimedia message content resource, after receiving a selection confirmation instruction, taking a multimedia message content which has been selected and determined as the corresponding use of the current multimedia message content resource to store into the multimedia message resource pool; if not, storing the use of the multimedia message content resource into the multimedia message resource pool directly.

5. The method according to claim 4, wherein, the step of organizing the multimedia message content resources in the multimedia message resource pool according to preset multimedia message organization parameters comprises:
  organizing the multimedia message content resource already stored in the multimedia message resource pool into the corresponding multimedia message content according to a corresponding use of each multimedia message content resource.

6. The method according to claim 5, wherein,
  the multimedia message content resources with the same use are organized in the corresponding multimedia message content according to an order by which the multimedia message content resources with the same use are stored into the multimedia message resource pool.

7. A system for creating a multimedia message, comprising:
  a processor; and
  a storage device for storing processor executable instructions that when executed by the processor cause the processor to perform the steps in the following modules:
  a multimedia message resource pool, configured to store a multimedia message content resource in a mobile terminal;
  a multimedia message resource pool management module, configured to notify the resource connection module to establish a connection channel between the multimedia message resource pool and a module storing multimedia message content resources in the mobile terminal after receiving a request for creating the multimedia message, and store a required multimedia message content resource into the multimedia message resource pool through the connection channel;
  a resource connection module, configured to establish the connection channel between the module storing the multimedia message content resources and the multimedia message resource pool in the mobile terminal after receiving a notification of the multimedia message resource pool;
  a multimedia message organization parameter setting module, configured to set multimedia message organization parameters; and
  a resource organization module, configured to organize the multimedia message content resources stored in the multimedia message resource pool according to the parameters set by the multimedia message organization parameter setting module, and generate the multimedia message without requiring a user entering a user interface for creating a multimedia message and without requiring repeating the multimedia message creating process for each page of the multimedia message, wherein the multimedia message organization parameters comprise one or more of following: a multimedia message organization rule and a resource supported by each content of the multimedia message;
  wherein the multimedia message organization parameters are a system default setting of the mobile terminal or setup by the user before creating the multimedia message;
  wherein,
  the multimedia message organization parameter setting module is further configured to set a maximum number of pages of the multimedia message and a capacity of the multimedia message;
  the multimedia message resource pool management module is configured to calculate a capacity of each page of the multimedia message according to the maximum number of pages of the multimedia message and the capacity of the multimedia message;
  the resource organization module is configured to organize the multimedia message content resources stored in the multimedia message resource pool according to the parameters set by the multimedia message organization parameter setting module in the following way:
  obtaining a current number of pages of the multimedia message, judging whether the current number of pages of the multimedia message reaches the maximum number of pages of the multimedia message, and whether a capacity of the current page of multimedia message reaches the capacity of each page of the multimedia message, if not, waiting for a new multimedia message content resource to be stored into the multimedia message resource pool, and continuing to organize the new multimedia message content resource.

8. The system according to claim 7, wherein,
  the module storing the multimedia message content resources in the mobile terminal comprises one or more of the following: an address book module, a memorandum book module or a multimedia resource management module.

9. The system according to claim 7, wherein,
  the multimedia message resource pool management module is configured to store the multimedia message content resource into the multimedia message resource pool through the connection channel in the following way: storing the multimedia message content resource and a corresponding use of the multimedia message content resource into the multimedia message resource pool.

10. The system according to claim 9, wherein, the multimedia message resource pool management module is configured to determine the use of the multimedia message content resource in the following way: judging whether a current multimedia message content resource is a resource supported by a plurality of multimedia message contents according to the resource supported by each content of the multimedia message; if yes, sending out an instruction of selecting a multimedia message content that supports the multimedia message content resource, after receiving a selection confirmation instruction, taking the multimedia message content which has been selected and determined as the corresponding use of the multimedia message content resource to store into the multimedia message resource pool; if not, storing the use of the multimedia message content resource into the multimedia message resource pool directly.

11. The system according to claim 10, wherein,
  the resource organization module is configured to: organize the multimedia message content resources stored in the multimedia message resource pool according to the parameters set by the multimedia message organization parameter setting module in the following way:

organizing the multimedia message content resource already stored in the multimedia message resource pool into the corresponding multimedia message content according to a corresponding use of each multimedia message content resource.

12. The system according to claim 11, wherein, the resource organization module is configured to: organize the multimedia message content resources with the same use according to an order by which the multimedia message content resource with the same use are stored into the multimedia message resource pool.

* * * * *